(12) United States Patent
Saarepera et al.

(10) Patent No.: US 8,312,528 B2
(45) Date of Patent: Nov. 13, 2012

(54) SYSTEM AND METHOD FOR GENERATING A DIGITAL CERTIFICATE

(75) Inventors: Mart Saarepera, Tallinn (EE); Ahto Buldas, Tallinn (EE)

(73) Assignee: Guardtime IP Holdings Limited (VG)

( * ) Notice: Subject to any disclaimer, the term of this patent is extended or adjusted under 35 U.S.C. 154(b) by 256 days.

(21) Appl. No.: 12/696,623

(22) Filed: Jan. 29, 2010

(65) Prior Publication Data

US 2010/0199342 A1  Aug. 5, 2010

Related U.S. Application Data

(62) Division of application No. 11/005,838, filed on Dec. 7, 2004, now Pat. No. 7,698,557.

(60) Provisional application No. 60/531,865, filed on Dec. 22, 2003.

(51) Int. Cl.
H04L 29/06 (2006.01)

(52) U.S. Cl. .......................... 726/10; 713/156; 713/175

(58) Field of Classification Search ...................... 726/10
See application file for complete search history.

(56) References Cited

U.S. PATENT DOCUMENTS

| | | | |
|---|---|---|---|
| 4,200,770 | A | 4/1980 | Hellman et al. |
| 4,218,582 | A | 8/1980 | Hellman et al. |
| 4,309,569 | A | 1/1982 | Merkle |
| 4,879,747 | A | 11/1989 | Leighton et al. |
| 4,881,264 | A | 11/1989 | Merkle |
| 4,944,009 | A | 7/1990 | Micali et al. |
| 4,995,081 | A | 2/1991 | Leighton et al. |
| 5,003,597 | A | 3/1991 | Merkle |
| 5,016,274 | A | 5/1991 | Micali et al. |
| 5,136,646 | A | 8/1992 | Haber et al. |
| 5,136,647 | A | 8/1992 | Haber et al. |
| 5,150,409 | A | 9/1992 | Elsner |
| 5,157,726 | A | 10/1992 | Merkle et al. |

(Continued)

FOREIGN PATENT DOCUMENTS

JP  A-11-289329  10/1999

(Continued)

OTHER PUBLICATIONS

Arne Ansper, Ahto Buldas, Märt Saarepera, Jan Willemson, Improving the Availability of Time-Stamping Services, Proceedings of the 6th Australasian Conference on Information Security and Privacy, p. 360-375, Jul. 11-13, 2001.*

(Continued)

*Primary Examiner* — Edward Zee
*Assistant Examiner* — Yogesh Paliwal
(74) *Attorney, Agent, or Firm* — James P. Muraff; Neal, Gerber & Eisenberg LLP

(57) ABSTRACT

A system and method for generating a digital certificate is provided wherein a new digital record is received and is assigned a sequence value. A first composite digital value is generated by applying a first deterministic function to the digital records stored in a repository. The sequence value and first composite digital value are included in a first certificate. After the digital record is added to the repository, a second composite digital value is generated by applying a second deterministic function to the digital records in the repository. This second composite digital value, and a composite sequence value, are published. An interval digital value which is based upon the first and second composite digital values, and the sequence value, are included in a second certificate which thus verifies the authenticity and sequence value of the digital record.

7 Claims, 13 Drawing Sheets

U.S. PATENT DOCUMENTS

| | | |
|---|---|---|
| 5,276,737 A | 1/1994 | Micali |
| 5,297,206 A | 3/1994 | Orton |
| 5,315,658 A | 5/1994 | Micali |
| 5,351,302 A | 9/1994 | Leighton et al. |
| 5,373,561 A | 12/1994 | Haber et al. |
| 5,400,403 A | 3/1995 | Fahn et al. |
| RE34,954 E | 5/1995 | Haber |
| 5,420,927 A | 5/1995 | Micali |
| 5,420,928 A | 5/1995 | Aiello et al. |
| 5,432,852 A | 7/1995 | Leighton et al. |
| 5,499,296 A | 3/1996 | Micali |
| 5,515,307 A | 5/1996 | Aiello et al. |
| 5,519,778 A | 5/1996 | Leighton et al. |
| 5,537,475 A | 7/1996 | Micali |
| 5,553,145 A | 9/1996 | Micali et al. |
| 5,604,804 A | 2/1997 | Micali et al. |
| 5,608,801 A | 3/1997 | Aiello et al. |
| 5,610,982 A | 3/1997 | Micali |
| 5,615,269 A | 3/1997 | Micali et al. |
| 5,629,982 A | 5/1997 | Micali et al. |
| 5,633,929 A | 5/1997 | Kaliski |
| 5,638,447 A | 6/1997 | Micali |
| 5,647,000 A | 7/1997 | Leighton |
| 5,659,616 A | 8/1997 | Sudia |
| 5,664,018 A | 9/1997 | Leighton |
| 5,666,414 A | 9/1997 | Micali |
| 5,666,416 A | 9/1997 | Micali et al. |
| 5,666,420 A | 9/1997 | Micali et al. |
| 5,699,528 A | 12/1997 | Hogan et al. |
| 5,708,714 A | 1/1998 | Lopez |
| 5,717,757 A | 2/1998 | Micali et al. |
| 5,717,759 A | 2/1998 | Micali et al. |
| 5,724,428 A | 3/1998 | Rivest |
| 5,727,063 A | 3/1998 | Aiello et al. |
| RE35,808 E | 5/1998 | Micali |
| 5,754,659 A | 5/1998 | Sprunk et al. |
| 5,781,629 A | 7/1998 | Haber et al. |
| 5,790,665 A | 8/1998 | Micali |
| 5,793,868 A | 8/1998 | Micali et al. |
| 5,799,086 A | 8/1998 | Sudia et al. |
| 5,812,670 A | 9/1998 | Micali |
| 5,835,600 A | 11/1998 | Rivest |
| 5,841,865 A | 11/1998 | Sudia et al. |
| 5,850,451 A | 12/1998 | Sudia et al. |
| 5,854,759 A | 12/1998 | Kaliski et al. |
| 5,857,022 A | 1/1999 | Sudia et al. |
| 5,867,578 A | 2/1999 | Brickell et al. |
| 5,872,849 A | 2/1999 | Sudia et al. |
| 5,892,829 A | 4/1999 | Aiello et al. |
| 5,903,651 A | 5/1999 | Kocher |
| 5,903,882 A | 5/1999 | Asay et al. |
| 5,948,061 A | 9/1999 | Merriman et al. |
| 5,949,885 A | 9/1999 | Leighton |
| 5,960,083 A | 9/1999 | Micali et al. |
| 5,960,411 A | 9/1999 | Hartman et al. |
| 5,966,440 A | 10/1999 | Hair |
| 5,987,138 A | 11/1999 | Gilbert et al. |
| 5,988,078 A | 11/1999 | Levine |
| 5,995,625 A | 11/1999 | Sudia et al. |
| 6,009,177 A | 12/1999 | Sudia et al. |
| 6,026,163 A | 2/2000 | Micali |
| 6,029,150 A | 2/2000 | Kravitz et al. |
| 6,035,041 A | 3/2000 | Frankel et al. |
| 6,052,467 A | 4/2000 | Brands |
| 6,078,163 A | 6/2000 | Horie et al. |
| 6,079,018 A | 6/2000 | Hardy et al. |
| 6,085,320 A | 7/2000 | Kaliski et al. |
| 6,085,321 A | 7/2000 | Gibbs et al. |
| 6,088,454 A | 7/2000 | Nagashima et al. |
| 6,097,811 A | 8/2000 | Micali et al. |
| 6,104,811 A | 8/2000 | Aiello et al. |
| 6,108,783 A | 8/2000 | Krawczyk et al. |
| RE36,918 E | 10/2000 | Micali |
| 6,130,621 A | 10/2000 | Weiss |
| 6,134,326 A | 10/2000 | Micali et al. |
| 6,137,884 A | 10/2000 | Micali et al. |
| 6,141,750 A | 10/2000 | Micali et al. |
| 6,148,084 A | 11/2000 | Brands et al. |
| 6,154,841 A | 11/2000 | Oishi |
| 6,157,920 A | 12/2000 | Jakobsson et al. |
| 6,170,060 B1 | 1/2001 | Mott et al. |
| 6,188,766 B1 | 2/2001 | Kocher |
| 6,189,098 B1 | 2/2001 | Kaliski, Jr. |
| 6,192,130 B1 | 2/2001 | Otway |
| 6,209,091 B1 | 3/2001 | Sudia et al. |
| 6,212,281 B1 | 4/2001 | Vanstone |
| 6,226,743 B1 | 5/2001 | Naor |
| 6,237,097 B1 | 5/2001 | Frankel et al. |
| 6,240,184 B1 | 5/2001 | Huynh et al. |
| 6,442,689 B1 | 8/2002 | Kocher |

FOREIGN PATENT DOCUMENTS

| | | |
|---|---|---|
| JP | A-2002-244555 | 8/2002 |
| WO | WO 02/48843 | 6/2002 |
| WO | WO 01/31841 | 5/2011 |

OTHER PUBLICATIONS

Written Opinion and International Search Report for PCT International Application No. PCT/IB2004/004248 dated Apr. 26, 2005.

International Preliminary Examination Report on Patentability for Corresponding PCT Application No. PCT/IB/2004/004248 dated Mar. 28, 2006.

Examination Report dated Jan. 5, 2007 for corresponding European Patent Application No. 04806422.4.

Response to Examination Report dated Jan. 5, 2007 filed on May 2, 2007.

Office Action dated Dec. 1, 2010 for Japanese Application No. 2006-544600.

Response to Office Action dated Dec. 1, 2010 for Japanese Application No. 2006-544600.

Arne Ansper, Ahto Buldas, Mart Saarepera, Jan Willemson—"Improving the Availability of Time-Stamping Services" Proceedings of the 6th Australasian Conference on Information Security and Privacy, p. 360-375, Jul. 11-13, 2001.

Benaloh, Josh et al., Efficient Broadcast Time-Stamping (Extended Abstract), Apr. 21, 1992, 9 pages, Clarkson University, Potsdam, New York.

Bayer, Dave et al., Improving the Efficiency and Reliability of Digital Time-Stamping Sequences II: Methods in Communication, Security, and Computer Science, 1993, pp. 329-334, Springer Verlag, New York.

Office Action dated Jan. 7, 2009 for U.S. Appl. No. 11/005,838.

Response to Office Action dated Jan. 7, 2009 for U.S. Appl. No. 11/005,838.

Notice of Allowance dated Nov. 4, 2009 for U.S. Appl. No. 11/005,838.

Office Action dated Jan. 20, 2012 for U.S. Appl. No. 12/696,640.

\* cited by examiner

Table 1. Workflow of the Registering algorithm with inputs $[x_0, x_1, x_2, x_3, x_4]$.

| $n$ | State_hash | $x$ | Audit_log | $a$ | Computations |
|---|---|---|---|---|---|
| 0 | [] | $x_0$ | $[x_0]$ | 0 | - |
| 1 | $[x_0]$ | $x_1$ | $[x_0\ x_1]$ | 1 | $h_{0,1}$=Hash$(x_0, x_1)$ |
|   | [] | - | $[x_0\ x_1\ h_{0,1}]$ | 0 | - |
| 2 | $[h_{0,1}]$ | $x_2$ | $[x_0\ x_1\ h_{0,1}\ x_2]$ | 2 | - |
| 3 | $[h_{0,1}\ x_2]$ | $x_3$ | $[x_0\ x_1\ h_{0,1}\ x_2\ x_3]$ | 3 | $h_{2,3}$=Hash$(x_2, x_3)$ |
|   | $[h_{0,1}]$ | - | $[x_0\ x_1\ h_{0,1}\ x_2\ x_3\ h_{2,3}]$ | 1 | $h_{0,3}$=Hash$(h_{0,1}, h_{2,3})$ |
|   | [] | - | $[x_0\ x_1\ h_{0,1}\ x_2\ x_3\ h_{2,3}\ h_{0,3}]$ | 0 | - |
| 4 | $[h_{0,3}]$ | $x_4$ | $[x_0\ x_1\ h_{0,1}\ x_2\ x_3\ h_{2,3}\ h_{0,3}\ x_4]$ | 4 | - |
| 5 | $[h_{0,3}\ x_4]$ |  |  |  |  |

FIGURE 11

Table 2. Workflow of the FindIntervalHash algorithm in the case $n=4$ and $N=7$.

| head | tail | $j$ | $b$ | $f=(n \oplus b)\text{or}(b-1)$ | $f \leq N$ | $n\&b=b$ | $2f-j$ | $2f-j+2$ |
|---|---|---|---|---|---|---|---|---|
| [] | [] | 2 | 1 | 5 | true | false | 8 | - |
| [] | $[x_5]$ | 2 | 2 | 7 | true | false | 12 | - |
| [] | $[x_5\ h_{6,7}]$ | 2 | 4 | 3 | true | true | - | 6 |
| $[h_{0,3}]$ | $[x_5\ h_{6,7}]$ | 1 | 8 | 15 | false | - | - | - |

FIGURE 12

Table 3. Workflow of the FindIntervalHash algorithm in the case $n=3$ and $N=7$.

| head | tail | $j$ | $b$ | $f=(n \oplus b)\mathrm{or}(b\text{-}1)$ | $f \leq N$ | $n\&b=b$ | $2f-j$ | $2f-j+2$ |
|---|---|---|---|---|---|---|---|---|
| [] | [] | 3 | 1 | 2 | true | true | - | 3 |
| $[x_2]$ | [] | 2 | 2 | 1 | true | true | - | 2 |
| $[x_2\ h_{0,1}]$ | [] | 1 | 4 | 7 | true | false | 13 | - |
| $[x_2\ h_{0,1}]$ | $[h_{4,7}]$ | 1 | 8 | | false | - | - | - |

FIGURE 13

SYSTEM AND METHOD FOR GENERATING A DIGITAL CERTIFICATE

CROSS-REFERENCE TO RELATED APPLICATIONS

This application is a divisional application of U.S. application Ser. No. 11/005,838 filed on Dec. 7, 2004 now U.S. Pat. No. 7,698,557, which claims priority from U.S. Provisional Application Ser. No. 60/531,865 filed on Dec. 22, 2003, both of which are incorporated herein by reference. This application is also being filed simultaneously with U.S. patent application Ser. No. 12/696,640, entitled "System And Method For Generating A Digital Certificate."

TECHNICAL FIELD

The present invention relates to the creation and renewal of digital certificates. More particularly, the present invention relates to a secure system and method for generating a digital certificate.

BACKGROUND OF THE INVENTION

Digital electronic records are increasingly used as proof of events. Historically, seals, signatures, special papers, and other tools were used to prove the authenticity of documents and other records. Moreover, in addition to proving the authenticity of documents and records, these and other tools have been used to prove that a document was received or produced in a certain order. These methods of proving authenticity and order are useful in a variety of fields, including banking, negotiations, legal filing, and public administration. Today, these services are typically offered by notaries, auditors, and the like.

Similar services of authentication and order verification are required in the marketplace of digitized electronic content. In a variety of fields of this marketplace, electronic service providers receive digital records. For example, an electronic banking system receives a digital record of a consumer purchase. These service providers record the sequence in which records are received, and assign each record a "sequence value." After the record has been received and registered by the service provider, a digital certificate is typically issued to the record-providing party. The need may later arise for either the service provider or another party to verify the order in which particular records were registered. To meet this need for verification, sequence values may be bound to digital records in such a way as to later prove that the sequence values reflect the order of registration in a correct and authentic way.

Typically, this binding of sequence numbers to digital records is accomplished by asymmetric cryptography or, as an alternative method, by publishing. A verifiable binding is referred to as a an order certificate. Without verifiable bindings, service providers could deny the validity of anything that is presented as a certificate.

When asymmetric cryptography is used to make the verifiable binding, the service provider typically signs a digital record (containing a corresponding sequence value) with a digital signature or encryption scheme, such as RSA. Public key cryptography is fast enough to enable almost instantaneous certificate generation. However, there is an inherent weakness in using asymmetric cryptography to create digital signatures: Cryptographic signature keys may become compromised. Once a key has become compromised, the certificates created with that key are no longer verifiable. Since the likelihood that a key will become compromised increases over time, certificates created by using keyed cryptographic are useful only for a short term.

When publishing is used to make the verifiable binding, the service provider typically publishes a digital record together with a sequence value in a widely-witnessed manner, for example, in a newspaper. If the service provider commits to certain rules regarding publication, then the published content can be relied upon as having been certified by the service provider. Since no cryptographic keys are used in the publication method, the problem of key compromise is not a concern. However, the publication method is inefficiently slow. Publication is realistic daily or weekly, but instant certificate creation, though demanded by the modern electronic market, is impossible.

To verify the authenticity of certificate for a long term, and to do so efficiently, publishing-based bindings and/or multiple key signatures can be used in combination. However, since this combination approach has the disadvantages of both systems, certificates must be regularly updated, creating additional expense to maintain the validity of the bindings.

There is another fundamental problem related to concerns the properties of the sequence values themselves, typically represented as integers. To some extent, verifiable bindings between digital records and integers can be viewed by verifying parties as proof that the records did indeed receive these sequence values.

Often, however, the sequence numbers assigned to digital records do not accurately reflect the real temporal order in which records were received. Malicious service providers may assign sequence numbers to records in any order they so desire. Thus, a need has arisen to detect erroneous behavior of a service provider. The concept of numbering records can be too abstract to reflect the registration process. For example, an assertion that three records were registered before any one particular record does not provide any information about how the records were registered. One way to overcome this problem is to define the sequence value of a particular record as the set of all records preceding a particular record in the repository. Such "sequence values" represent the order of registering, but since they also record the history of the repository, they cannot be denied by the service provider. However, if each sequence value reflects the entire history of the repository, the values may become so large as to make their calculation and transmission impractical.

One way to confirm the history of a service provider is to include a cryptographic digest of all previously registered records in the digital certificate issued to the record-providing party. For example, a linear chain hash may be created by applying a cryptographic hash function to a concatenation of a newly-received record and the record received immediately prior to it. Such a method is disclosed in U.S. Pat. No. 5,136,646 to Haber et al. Cryptographic digests which are included in order certificates create causal, one-way relationships between the confirmations and thus can be used to verify their order without fear of erroneous behavior by the service provider, because any erroneous confirmation is detectable by a verifier examining the one-way causal hash chain. The sequence values created by such processes are shorter because of the use of cryptographic hash functions. However, verifying such values still requires a calculation of all records in the repository, and thus can consume significant processing resources. This process is further disadvantageous because it cannot be performed without interaction with the service provider.

Currently, efficient verifiable bindings are created with asymmetric cryptography. However, in a number of applications there is a need for longer-term verifiable bindings that are desirably verifiable without the use of cryptographic keys. Accordingly, a need has arisen for a digital electronic record registration system with procedures that enable clients to replace short-term, digitally-signed certificates (via asymmetric cryptographic methods) with long-term certificate proofs which are based on cryptographic digests and publishing methods.

The present invention is provided to solve these and other problems summary of the invention.

SUMMARY OF THE INVENTION

A system and method for generating a digital certificate is disclosed in which clients submit digital records to a registration service provider. The records are recorded and clients receive a digitally-signed certificate which verifies the registration (and registration number) of the record. These digitally-signed certificates can then be replaced by a certificate proof which is generated by applying a cryptographic hash function to the repository of all records.

In one embodiment of the present invention, a system and method for generating a digital certificate is disclosed in which a client submits a digital record to a registration service provider. A composite digital value is generated which represents at least a subset of the entire history of previously received records, wherein the composite digital value is generated by applying a deterministic algorithm to the elements stored in a repository. A confirmation certificate is then generated and transmitted to the client, wherein the certificate comprises at least the digital record, a sequence number assigned to the record, and the composite digital value. The certificate is signed digitally using an asymmetric cryptographic scheme. Thereafter, the digital record, or a representation thereof, is added to the repository.

In another embodiment of the present invention, a system and method for publishing a cryptographic digest of a repository of digital records is disclosed. A composite digital value which represents at least a subset of the entire history of received records is generated, wherein the composite digital value is generated by applying a deterministic algorithm to the elements stored in the repository. A composite sequence number is also generated and set equal to the current sequence number of the repository. This composite digital value, and the composite sequence number of the repository, are then published to the public.

In another embodiment of the present invention, a system and method for creating a certificate proof for a digital record is disclosed in which an interval digital value is generated for the record relative to a published composite digital value. A certificate proof is then generated, wherein the certificate proof includes at least the interval digital value and the sequence number of the record, and may also include a subset of the digital record itself, the composite digital value, and the composite sequence number.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 11 is an illustration of a table for use with the system and method for generating a digital certificate, illustrating the workflow of an algorithm for registering a digital record.

FIG. 12 is an illustration of a table for use with the system and method for generating a digital certificate, illustrating the workflow of an algorithm for generating a digital interval value.

FIG. 13 is an illustration of a table for use with the system and method for generating a digital certificate, further illustrating the workflow of an algorithm for generating a digital interval value.

DETAILED DESCRIPTION

Figure 1:
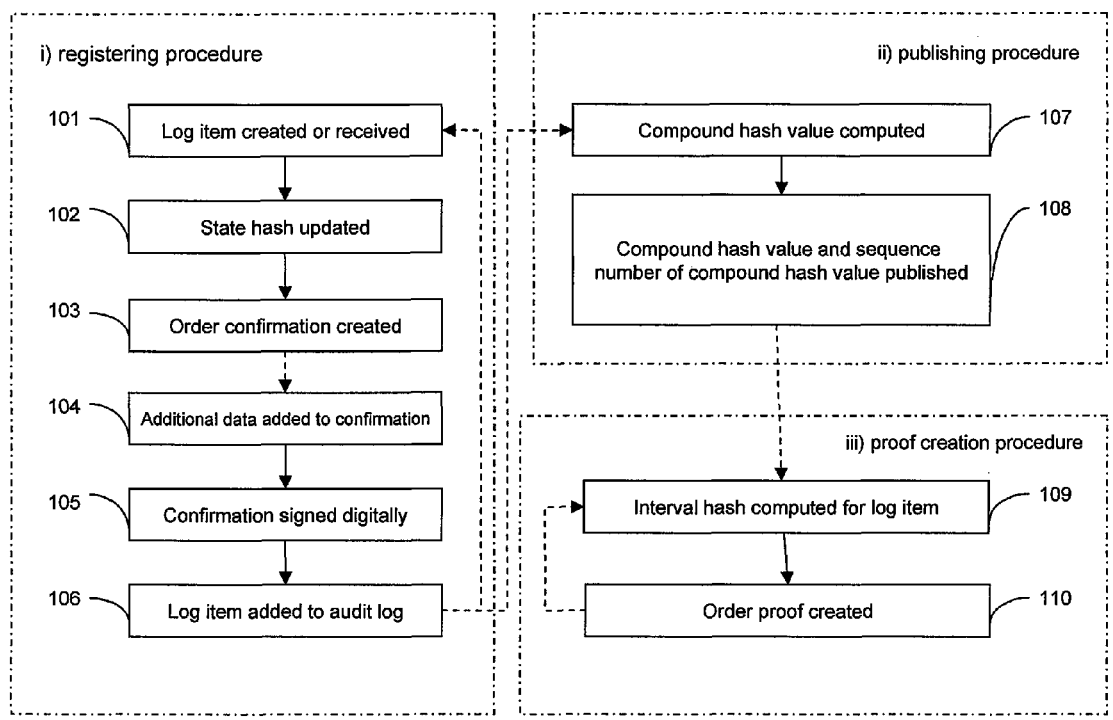
FIG. 1 is the general flowchart of the system and method for generating a digital certificate, illustrating in general the steps for registering a digital record in a repository, cryptographically publishing a digest of the repository, and generating a certificate proof for the digital record.

While this invention is susceptible of embodiment in many different forms, there are shown in the drawings and herein described in detail preferred embodiments with the understanding that the present disclosure is to be considered an exemplification of the principles of the invention and is not intended to limit the broad aspect of the invention to the embodiments illustrated.

Referring in detail to the drawings and initially to FIG. 1, there is provided a system and method for generating a digital certificate. The system and method, in abstract, comprises three primary functionalities. The first primary functionality is the registration of a new digital record. In step 101, the new digital record is created or received. A digital record is a representation of a data item, and the data item can represent any type of digital information. For example, the data item may be an electronic document, order information, identification information, or any other type of digitally-represented information. As a representation of the data item, the digital record may comprise the data item in its entirety, may comprise a portion of the data item, or may comprise some other representation of the data item. In a preferred embodiment, the new digital record is received in step 101. In another preferred embodiment, the new digital record is created in step 101 based on a received data item, and then stored in a repository of digital records.

In step 102, a first deterministic function is applied to at least a subset of the digital records stored in the repository, thereby generating a first composite digital value. In a preferred embodiment, the first deterministic function is applied to all of the digital records stored in the repository, thus ensuring that the first composite digital value is a representation of the entire history of the repository and thereby reducing the possibility that the owner of the repository may later tamper with the contents of the repository.

Also in step 102, a sequence number is assigned to the new digital record. In a preferred embodiment, the sequence number represents the order in which the new digital record is received. For example, if there are ten digital records stored in the repository when the new digital record is received, sequence number 11 will be assigned to the new digital record. However, the sequence number can be any representation of the time or order in which the new digital record is received.

In step 103, a first certificate is generated such that the certificate verifies the receipt of the new digital record. The first certificate comprises at least the sequence number assigned to the new digital record, and the first composite digital value. In a preferred embodiment, since the sequence number indicates the time at, or order in which, the new digital record was received, and the first composite digital value represents the history of the repository when the new digital record was received, the first certificate therefore may be used to verify the sequence number.

In step 104, additional information may optionally be added to the first certificate. For example, in a preferred embodiment, the first certificate additionally comprises the new digital record or a portion thereof. This inclusion is useful in verifying that the contents of the digital record were correctly received by the repository. In another preferred embodiment, the additional information may be a timestamp indicating the precise time at which the new digital record is received.

In step 105, a digital signature is applied to the first certificate. The digital signature may be any type of signature such that the signature authenticates the identity of the owner of the repository. For example, the digital signature may be based on a private/public key encryption scheme, such as RSA. In a preferred embodiment, the first certificate is digitally signed using a private key of the owner of the repository. Preferably, the first certificate is transmitted to the creator or provider of the digital record.

In step 106, the new digital record or a representation thereof is added to the repository. The step 106 of adding the new digital record to the repository may be performed before or after the generation of the first composite digital value in step 102. In a preferred embodiment, the new digital record is added to the repository after the generation of the first digital certificate in step 103, so as to reduce the wait time required for the provider of the new digital record to receive the first digital certificate. After the new digital record is added to the repository in step 106, additional digital records may be created or received; in other words, the system may return to step 101.

The second primary functionality of the system and method for generating a digital certificate is the publication of information pertaining to the repository. In step 107, a second composite digital value is generated by applying a second deterministic function to at least a subset of the digital records stored in the repository. Like the first composite digital value, the second composite digital value represents the history of the repository at a particular time. In a preferred embodiment, the first and second deterministic functions are not the same functions. Preferably, the second deterministic function is applied to all of the digital records stored in the repository, and thus the second composite digital value represents the entire history of the repository, thereby reducing the threat that the owner of the repository may tamper with the repository.

In step 108, a composite sequence number is generated, wherein the sequence number corresponds to the order in which the second composite digital value is generated. The composite sequence number thereby is an indication of the temporal quality of the second composite digital value. In step 108, the second composite digital value and the composite sequence number are published, i.e., transmitted to a public forum. The public forum may be any source of information that is available to the general public. For example, the public forum may be a newspaper, a magazine, an Internet website, or electronic mail.

The third primary functionality of the system and method for generating a digital certificate is the creation of a second certificate which proves the authenticity of the sequence number of the new digital certificate. In step 109, a digital interval value is generated, wherein the digital interval value is based upon the first and second composite digital values. In a preferred embodiment, the digital interval value is the result of the application of a third deterministic function applied to the digital records stored in the repository between the receipt of the new digital record and the generation of the second composite digital value. Thus, the digital interval value can reflect the history of the repository between the receipt of the new digital record and the publication of the second composite digital value. However, the digital interval value can also be the result of the application of a deterministic function applied to all of the digital records stored in the repository, and thereby reflect the entire history of the repository.

In step 110, a second certificate is generated, wherein the second certificate includes at least the digital interval value and the sequence number of the new digital record. Because the digital interval value reflects the history of the repository since the new digital record was added to the repository, or an earlier time, the digital interval value can thus be used to verify the accuracy of the sequence number. The digital interval value may also be used to renew, i.e., extend, the authenticity of the new digital record. Since the generation of the digital interval value is not based upon the use of encryption keys, the security of the second digital certificate is not subject to encryption key compromise.

Figure 2:
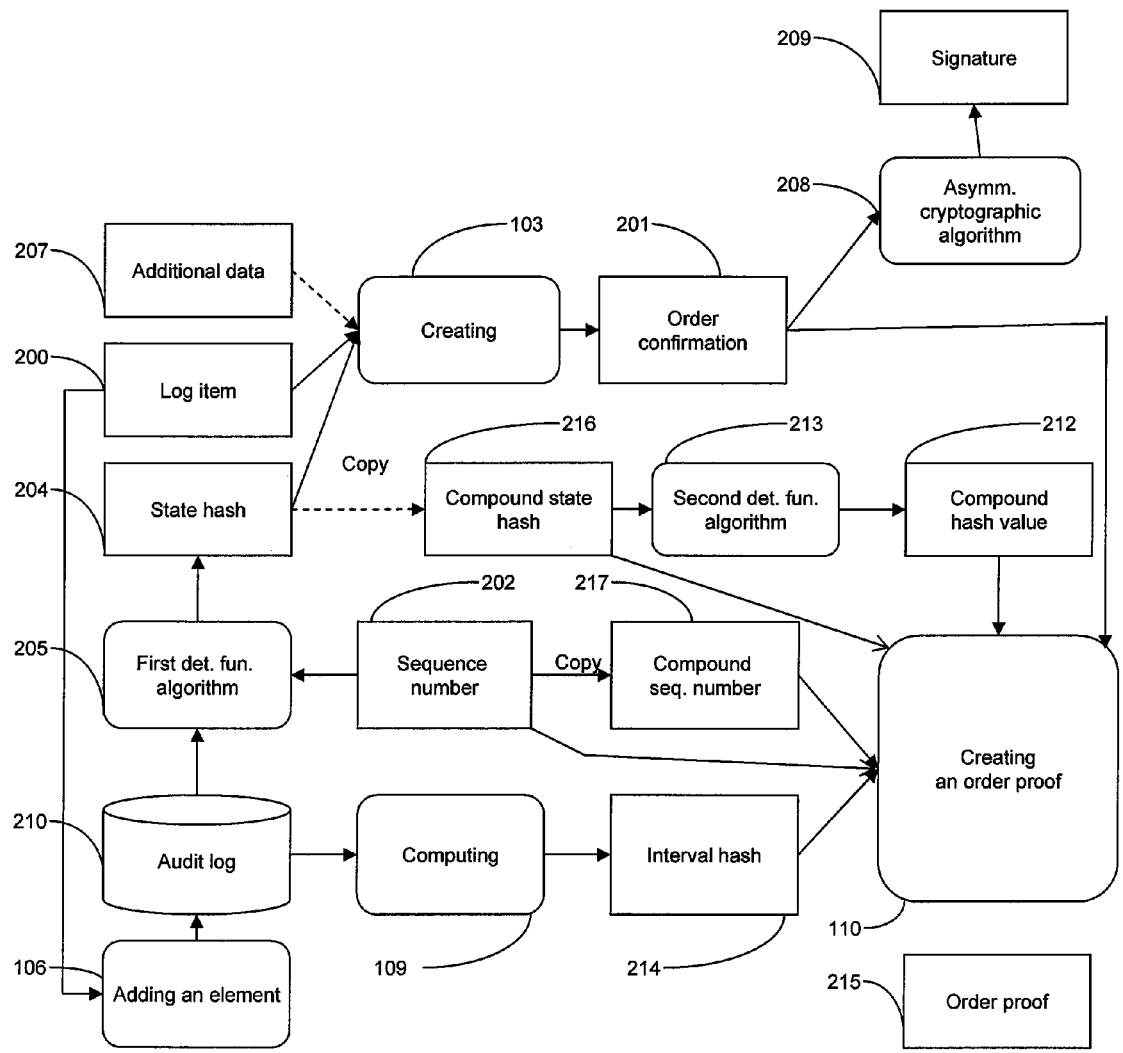
FIG. 2 is a flowchart of a portion of the system and method for generating a digital certificate, illustrating in detail the procedure for registering a digital record in a repository and generating a digital certificate verifying the registration of the record.

Referring now to FIG. 2, there is provided in detail the steps of the method for generating a digital certificate. In step 106, the new digital record 200 is added to the repository 210. In step 205, a first deterministic function is applied to at least a subset of the digital records stored in the repository so as to produce a first composite digital value 204. The step of adding the new digital record 200 to the repository 106 may be performed either before or after the step of applying the first deterministic function 205 to the repository 210. A sequence number 202 is assigned to the new digital record 200, wherein the sequence number represents the temporal value of the new digital record 200, i.e. the order in which the new digital record 200 was received.

In step 103, the first certificate 201 is generated. The first certificate 201 includes at least the first composite digital value 204 and the sequence number 202 of the new digital certificate 200. Additionally, the first certificate 201 may include the new digital record 200 itself, and other additional data 207. In step 208, the first certificate 201 is signed with a digital signature 209, wherein the digital signature 209 is preferably based on a public key encryption scheme.

In step 213, a second deterministic function is applied to the digital records stored in the repository 210 to generate a second composite digital value 212. A composite sequence number 217 is generated, and is preferably set equal to the currently next-available sequence number in the repository 210. In step 109, a digital interval value 214 is generated, wherein the digital interval value 214 reflects the temporal difference between the receipt of the new digital record 200 and the generation of the second composite digital value 212. Lastly, in step 110, a second certificate 215 is generated, wherein the second certificate 215 comprises at least the sequence number 202 of the new digital record 200 and the digital interval value 212. Additionally, as indicated in step 110, the second certificate 215 may comprise all or a portion of the first certificate 201, and the composite sequence number 217.

Figure 3:
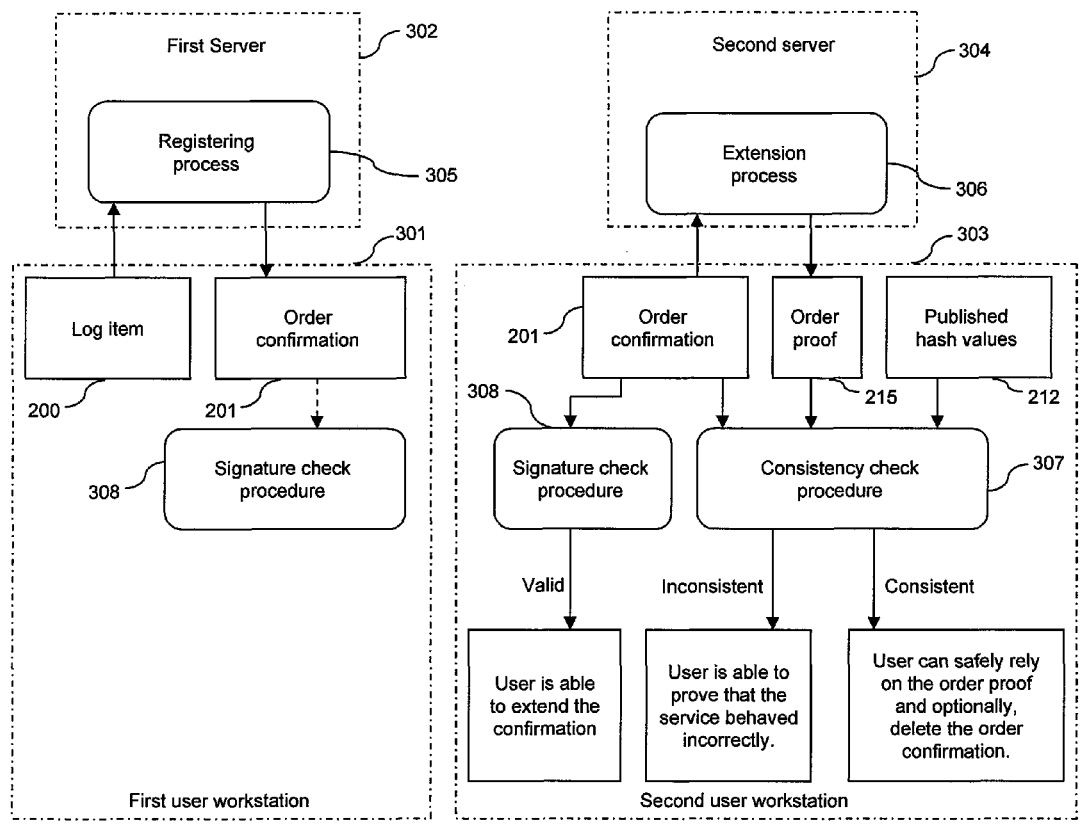
FIG. 3 is a flowchart of a portion of the system and method for generating a digital certificate, illustrating in detail the procedure for generating a certificate proof for a digital record.

Referring now to FIG. 3, there is provided in detail the steps of verifying the second certificate 215. A first certificate 201 is received from server 302 by a client 301, wherein the first certificate 201 was preferably signed with a digital signature 209. Optionally, upon receipt of the first certificate 201, a signature check procedure 308 is performed to initially verify the authenticity of the first certificate 201. Preferably, the signature check procedure 308 consists of using a key-based encryption scheme.

The first certificate 201 is received by a second client 303, and a signature check procedure 308 is performed to verify the authenticity of the first certificate 201. In a preferred embodiment, upon a determination in step 308 that the digital signature 209 of the first certificate 201 is invalid, the second client 303 will be unable to confirm or validate the first certificate 201. Upon a finding that the digital signature 209 of the first certificate 201 is valid, the first certificate 201 is transmitted to a second server 304, at which the first certificate is renewed, extended, and validated by application of the method herein described for generating the second certificate 215. The second certificate 215 is then transmitted to the second server 304. The published second composite digital value 212 and composite sequence number 217 are publicly available to the second client 303. Thus, based on those values, the second certificate 215 and the first certificate 201, the second client 303 may verify the validity of the sequence number 202 via the verification process 307. Upon a determination that the first certificate 201 and second certificate 215 are consistent, the second client 303 is able to rely upon the authenticity of the sequence number 202 and digital record 200 provided by the first client 301.

Figure 4:
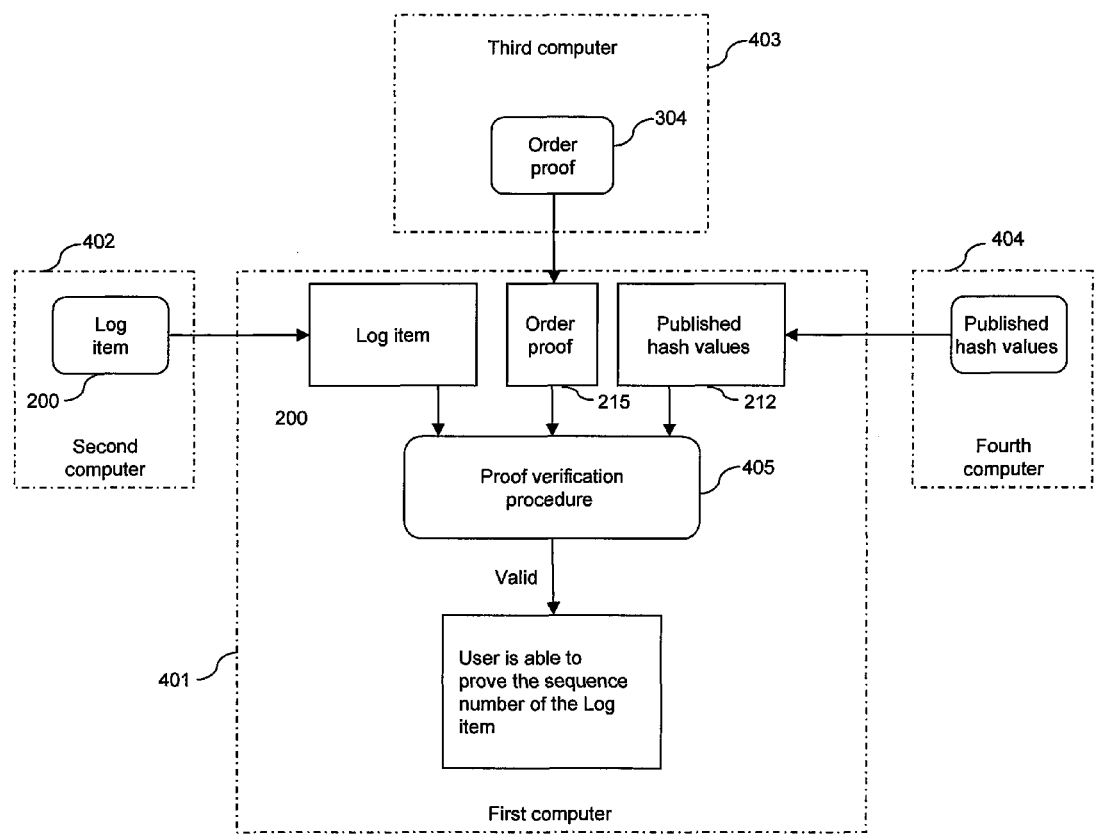
FIG. 4 is a flowchart of one application of the system and method for generating a digital certificate, illustrating the procedure for using a certificate proof to verify the receipt and sequence number of a digital record.

Referring now to FIG. 4, there is provided in detail another embodiment of the system and method for verifying a digital record 200. A digital record 200 is transmitted from a client 402 to a verifying server 401. The second certificate 215 is received from an extension server 403, where the process of generating the second certificate 215 has been performed. The second composite digital value 212 and composite sequence number 217, collectively referred to as the public values 212, are published on public server 404, and are received by verifying server 401. The second certificate 215, digital record 200, and public values 212 are used in the verification process 405 herein described. Thus, the verifying server 401 may rely upon the validity of the digital record 200 submitted by the client 402.

Figure 5:
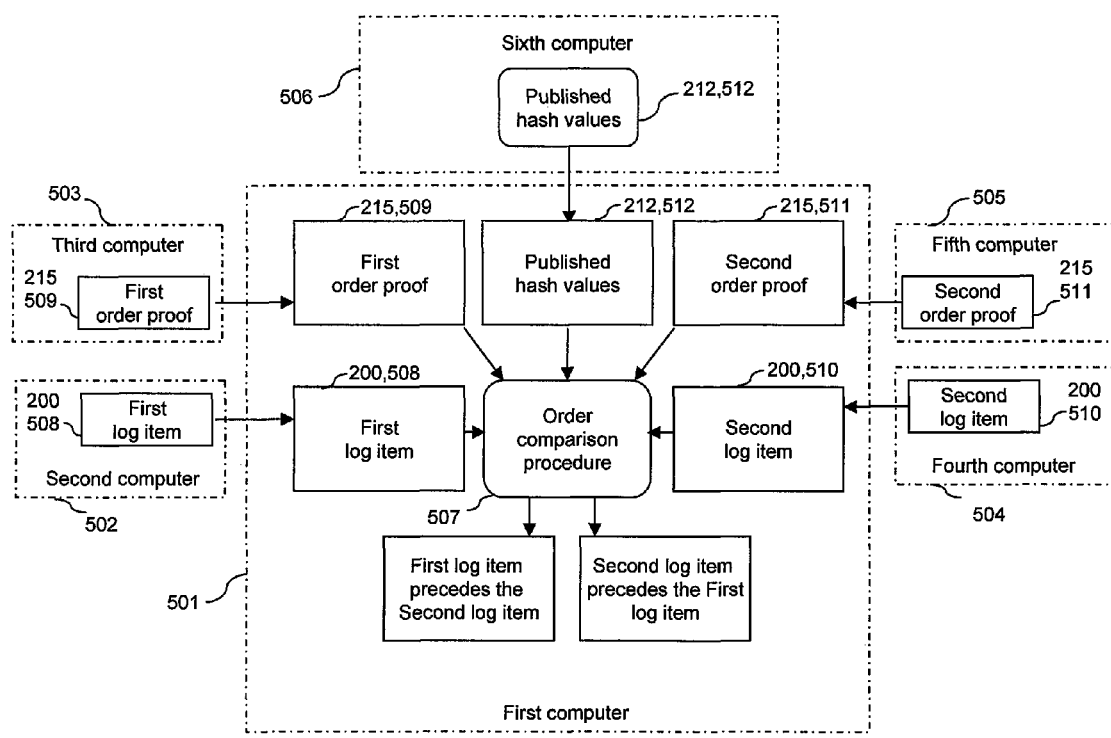
FIG. 5 is a flowchart of one application of the system and method for generating a digital certificate, illustrating the procedure for using certificate proofs to verify the receipt and sequence numbers of more than one digital record.

Referring now to FIG. 5, there is provided in detail an embodiment of the system and method for registering digital records, wherein a verifying server 501 may verify the order of sequence values 202 of competing digital records 200 provided by first and second clients 502 and 504, respectively. A first client 502 transmits a first digital record 503 to the verifying server 501, accompanied by the second certificate 509 corresponding to the first digital record 503. A second client 504 transmits a second digital record 510 to the verifying server 501, accompanied by the second certificate 511 corresponding to the second digital record 510. Thus, the verifying server 501 may use the system and method described herein to determine which of the competing digital records 200 was registered earlier.

The public values 512, published on a public server 506, are received by the verifying server 501. Using the verification process 507 described herein, the verifying server 501 may rely upon the first and second digital records 200 and accompanying second certificates to determine which of the digital records 200 are authentic. Moreover, since the sequence numbers 202 of the digital records 200 are reflected in the second certificates 215, the verifying server 501 may also determine the authentic order in which the digital records 200 were received.

Figure 6:
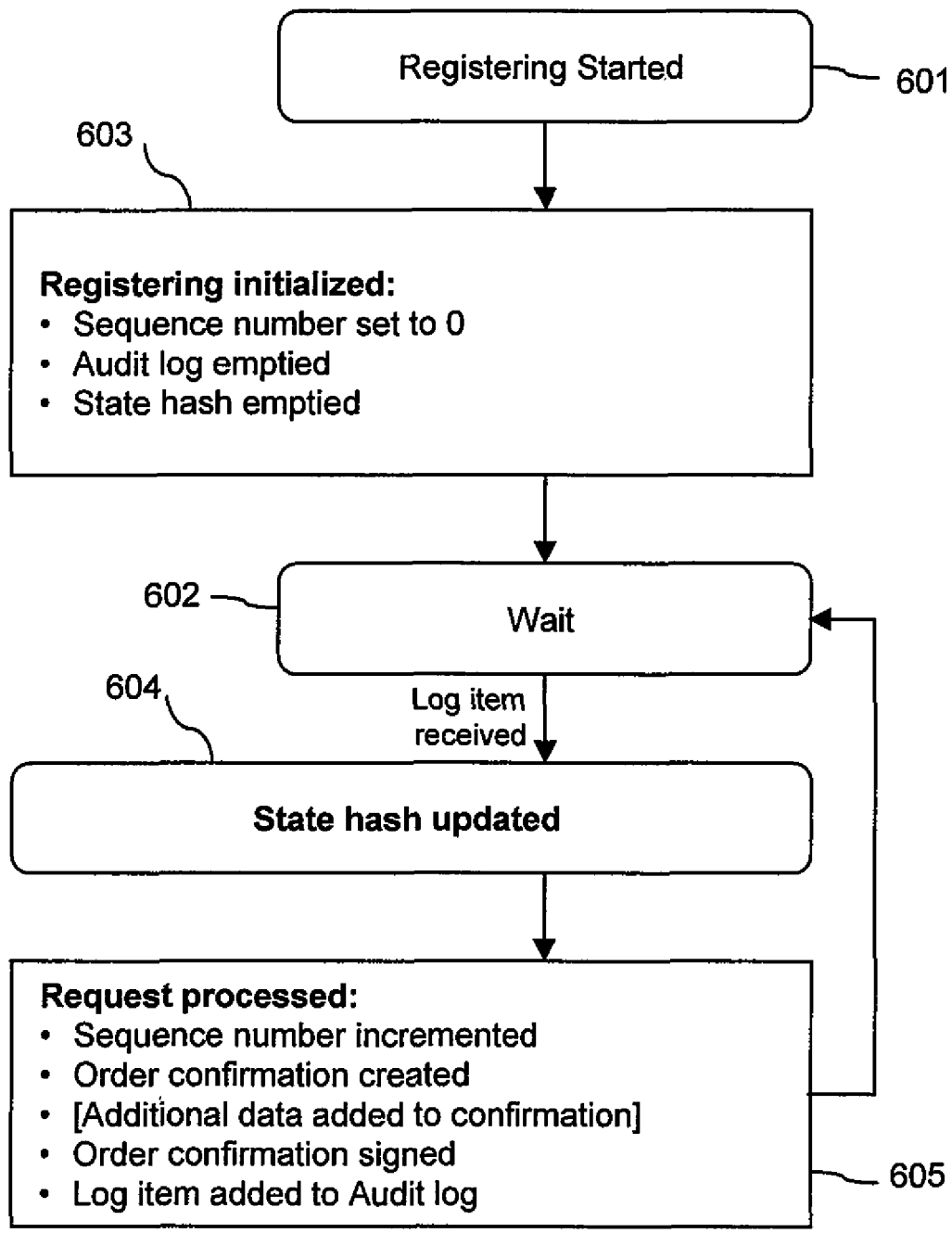
FIG. 6 is a state transition diagram of the portion of the system and method for generating a digital certificate, illustrating the states and transitions therebetween for the generation of a first digital certificate.

Referring now to FIG. 6, a state transition diagram is provided further illustrating the states and transitions therebetween for registering a new digital record and generating a first digital certificate. In step 603, the registration system is initialized. The sequence value is set to zero, the repository is cleared of digital records, and the composite digital values are cleared. In step 602, the system waits to receive a digital record. When a digital record is received, the first composite digital value is generated in step 604. In step 605, a sequence value is assigned to the new digital record, and a first digital certificate is generated according to the procedures described herein. The first digital certificate is digitally signed. Lastly, the new digital record is added to the repository. After registration is complete in 605, the system returns to a state of waiting 602 to receive another new digital record.

Figure 7:
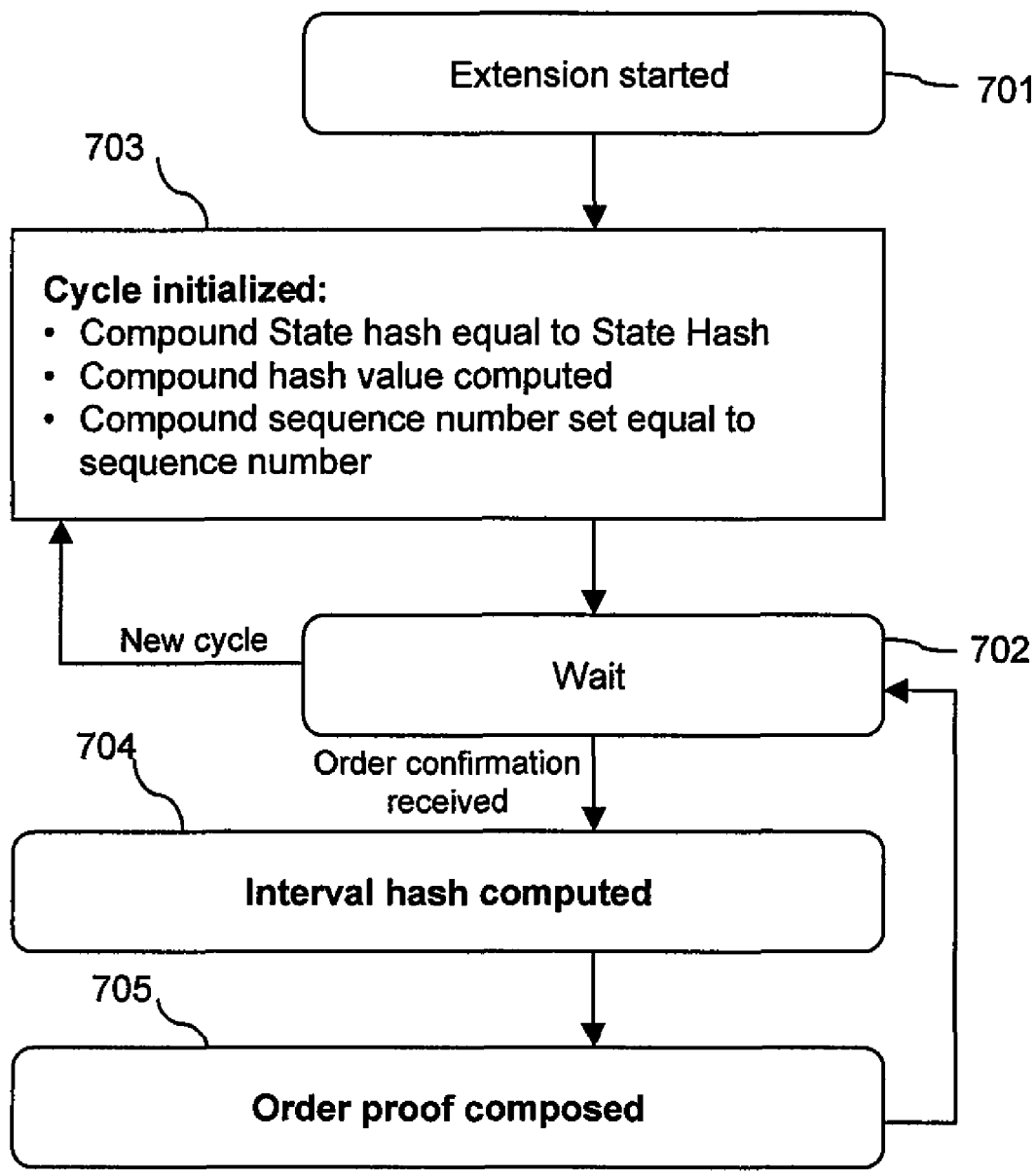
FIG. 7 is a state transition diagram of the portion of the system and method for generating a digital certificate, illustrating the states and transitions therebetween for the generation of a second digital certificate and renewal of a first digital certificate.

Referring now to FIG. 7, a state transition diagram is provided further illustrating the states and transitions therebetween for extending the first digital certificate. The system begins in step 701, and in step 703 the system is initialized. The second composite digital value is generated by applying the second deterministic function to the repository, and the composite sequence value is generated. The system then proceeds to a state of waiting 702 for the receipt of a digital certificate. If no digital certificate is received, the system may intermittently return to step 703 to re-initialize and re-generate the composite values. When a digital certificate is received, the interval digital value is generated in step 704 according to the process herein described. After the interval digital value is generated, the system generates a second digital certificate in step 705. Lastly, the system returns to a state of waiting 702 to receive another digital certificate. In a preferred embodiment, since the generation of the second digital certificate is dependent upon the contents of the first digital certificate, the system may be used to renew or extend the authenticity of the first digital certificate. The system may also be used to verify the authenticity of the first digital certificate, and may also be used to verify the authenticity of the digital record corresponding to the first digital certificate.

Figure 8:
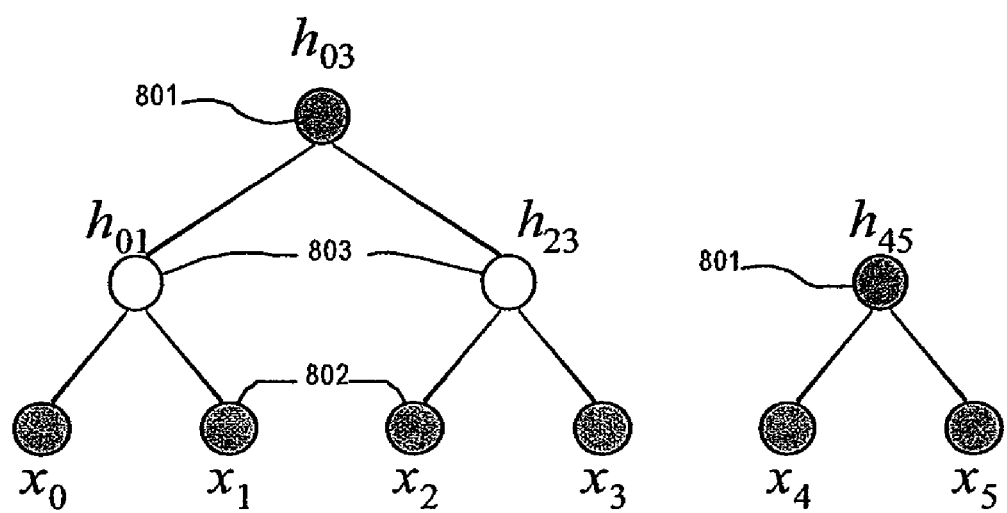
FIG. 8 is an illustration of a data structure for use with the system and method for generating a digital certificate, illustrating a forest of binary hash trees.

Referring now to FIG. 8, a diagram is provided illustrating a data structure for use with the system and method for generating a digital certificate. In a preferred embodiment, the data structure is a forest of binary hash trees wherein every parent vertex of a binary tree is a cryptographic hash of the child vertices. The construction of the binary hash tree is performed on the fly, based on the receipt of new digital records. The new digital records are represented by hash values of a predetermined size, and are stored as leaves 802 of the binary hash trees. Because of the use of a binary tree data structure, the number of digital records stored in the repository need not be known and the topological parameters of the repository, for example, height and width, need not be determined. FIG. 8 thus represents the forest of binary hash trees data structure of the repository after six digital records have been received.

The leaf vertices 802 of the forest are organized naturally. The sequence number n of a leaf determines its position in the forest. If a new data record x.sub.n is received, it is first stored as a leaf with sequence value n and that tree is then updated. The updating process is organized so as to provide that only the root vertices 801 of the forest will participate in future generations of composite digital values. The list of root vertices thus serves a state hash for use in the generation of composite digital values. During the process of generating a composite digital value, any vertex of the structure that can be computed is computed and stored immediately. All leaves 802 are stored in their computational order, preferably corresponding to the post-order traversal of the tree. Since the root vertices 801 already represent the hash values of the leaf vertices 802, the leaf vertices 802 need not be considered in the generation of a composite digital value. Thus, the forest of binary hash trees data structure provides for very fast processing of the composite digital values.

Figure 9:
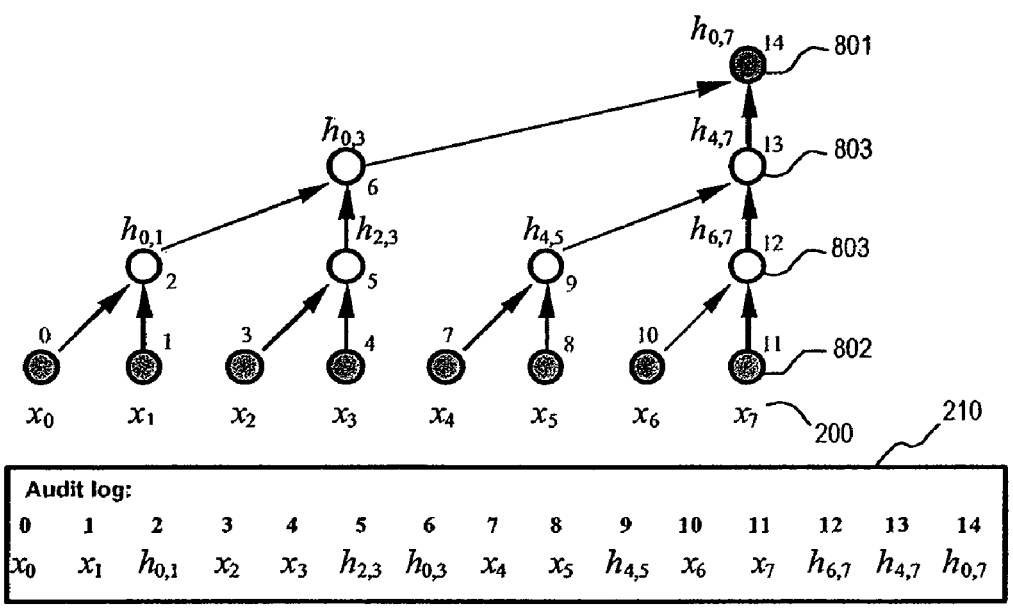
FIG. 9 is an illustration of a data structure for use with the system and method for generating a digital certificate, illustrating a forest of hash binary hash trees represented as an indexed array.

Referring now to FIG. 9, a diagram is provided illustrating a data structure for use with the system and method for generating a digital certificate, wherein the forest of binary hash trees data structure is further illustrated as an indexed array. The elements of an array representing the forest are stored in their computational order. Stated differently, the elements computed earlier in time have smaller indices than the elements computed later. The process of building the forest data structure preferably depends upon the use of a stack containing the root hash values h.sub.1 ... h.sub.s, with h.sub.s on the top of the stack. If (x.sub.0 ... x.sub.n−1) are the leaves of the forest, the number of elements in the stack is equal to the number of bits set in the binary representation of n. Each added leaf changes some values in the top of the stack, and the number of values being changed is equal to the number of rightmost 1-bits in the binary representation of n. For example, if n=23 the nth addition changes three elements of the stack because 23=10111.sub.2.

Figure 10:
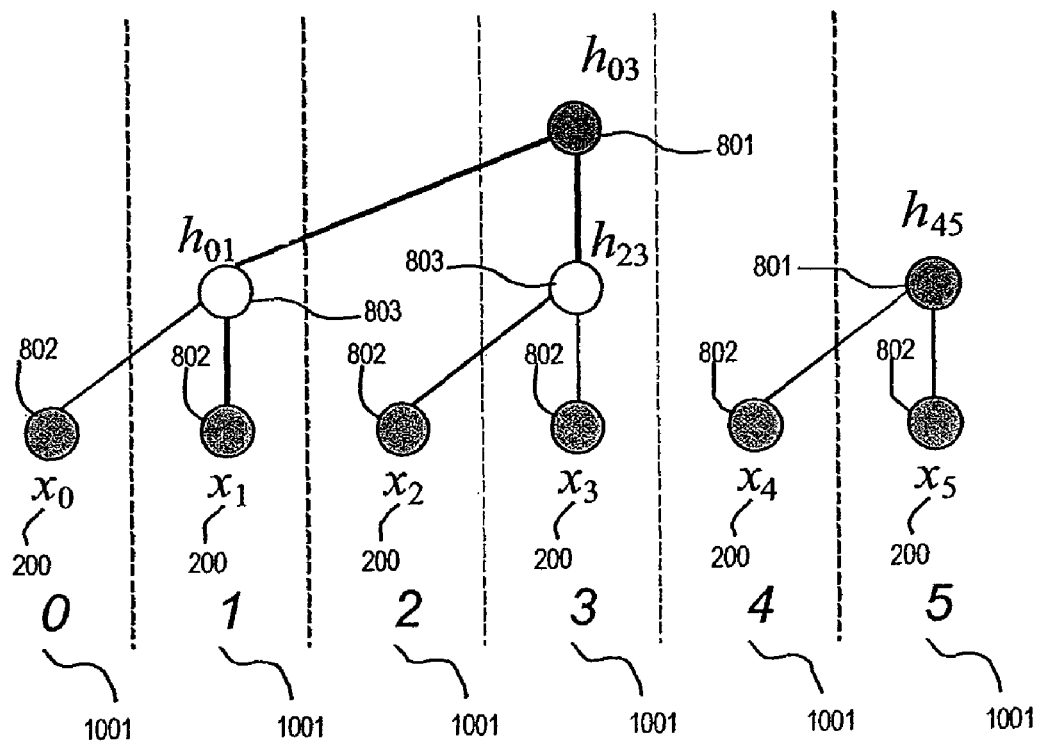
FIG. 10 is an illustration of a data structure for use with the system and method for generating a digital certificate, illustrating a forest of binary trees arranged in a layered data structure.

Referring now to FIG. 10, a diagram is provided illustrating a data structure for use with the system and method for generating a digital certificate, wherein the data structure is further illustrated as a layered forest of binary hash trees. It is preferable to organize the binary tree in layers in order to efficiently calculate the digital interval value. The nth layer 1001 is defined as a minimal subset of vertices satisfying two assumptions. First, the layer satisfies the assumption that for all n, the leaf x.sub.n belongs to the nth layer. Second, the layer satisfies the assumption that if one of the child vertices of a vertex v belongs to the nth layer and the other child belongs to the (n−k)th layer (where k.epsilon. {0 ... n}, then also the vertex v belongs to the nth layer. FIG. 10 depicts an example of a binary hash tree of six nodes organized in layers.

Referring now to FIG. 11, a table is provided illustrating the workflow of an algorithm for use with the system and method for generating a digital certificate. In a preferred embodiment, the algorithm for registering a digital record, where n represents the sequence number of the repository and x represents a new digital record, is provided as:

```
Composite_value=[ ], Repository=[ ]
n:=0
repeat
Receive_Record (x)
Reply (n, Composite_value, x)
Append (Repository, x)
Update (Repository, Composite_value, n, x)
n:=n+1
```

Depicted in FIG. 11 is a workflow illustrating the application of this algorithm with digital record inputs [x.sub.0, x.sub.1, x.sub.2, x.sub.3, x.sub.4]. The function Update (Repository, Composite_value, n, x) may further be defined as:

```
a:=n
while Odd (a) do
x:=Hash (Pop (Composite_value), x)
Append (Repository, x)
a:=a>>1
Push (Composite_value, x)
```

Referring now to FIG. 12, a table is provided illustrating the workflow of an algorithm for use with the system and method for generating a digital certificate. In a preferred embodiment, the algorithm for generating an interval digital value, where n represents the sequence number of the repository and N represents the composite sequence value, is provided as:

```
head:=[ ], tail:=[ ],j:=.parallel.n.parallel..sub.1+1, b:=1
while f:=[(n.sym.b) or (b−1)].ltoreq.N do
if b&n=b
Append (head, Repository [2f−j+2])
j:=j−1
else
Append (tail, Repository [2f−j])
b:=b<<1
```

Depicted in FIG. 12 is a workflow illustrating the application of this algorithm where n=4 and N=7. Depicted in FIG. 13 is a workflow illustrating the application of this algorithm where n=3 and N=7.

It will be understood that the invention may be embodied in other specific forms without departing from the spirit or central characteristics thereof. The present embodiments, therefore, are to be considered in all respects as illustrative and not restrictive, and the invention is not to be limited to the details given herein.

What is claimed is:

1. A system for generating a digital certificate, the system comprising:
    a server computer configured to:
        receive from a client computer a digital record,
        register the received digital record,
        generate a digital certificate for the digital record, and transmit the digital certificate to the client computer as verification of registration of the digital record, wherein the digital certificate generated by the server computer comprises a sequence value, wherein the sequence value represents a total number of digital records stored in a server computer repository of digital records at a particular time; and an interval digital value, wherein the interval digital value is a component of a composite digital value generated by an application of a deterministic function to at least a subset of the digital records stored in the repository at a particular time, the repository of digital records comprising a data structure based on a forest of binary hash trees.

2. The system of claim 1, wherein the deterministic function is dependent upon the sequence value.

3. The system of claim 1, wherein the composite digital value is generated by the application of the deterministic function to all of the digital records stored in the repository.

4. The system of claim 1, wherein the digital certificate further comprises at least a portion of a digital record.

5. The system of claim 1, wherein the sequence value represents the number of digital records stored in the repository when a digital record was added to the repository.

6. The system of claim 1, wherein the digital certificate further comprises a composite sequence value representing the number of digital records stored in the repository at a particular time.

7. The system of claim 6, wherein the composite sequence value is transmitted to a public forum.

* * * * *